(12) United States Patent
Horikawa

(10) Patent No.: US 9,025,011 B2
(45) Date of Patent: May 5, 2015

(54) IMAGE CAPTURING APPARATUS, PLAYBACK APPARATUS, CONTROL METHOD, IMAGE CAPTURING SYSTEM AND RECORDING MEDIUM

(71) Applicant: Canon Kabushiki Kaisha, Tokyo (JP)

(72) Inventor: Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 13/670,626

(22) Filed: Nov. 7, 2012

(65) Prior Publication Data

US 2013/0128006 A1    May 23, 2013

(30) Foreign Application Priority Data

Nov. 22, 2011  (JP) ................. 2011-255430

(51) Int. Cl.
  *H04N 13/02* (2006.01)
  *H04N 13/00* (2006.01)
(52) U.S. Cl.
  CPC ....... *H04N 13/0203* (2013.01); *H04N 13/0022* (2013.01); *H04N 13/0066* (2013.01)
(58) Field of Classification Search
  CPC .......... H04N 13/0003; H04N 13/0207; H04N 13/0217; H04N 13/0289
  See application file for complete search history.

(56) References Cited

U.S. PATENT DOCUMENTS

| 6,154,315 | A | * | 11/2000 | Street | 359/465 |
| 6,402,685 | B1 | * | 6/2002 | Igarashi | 600/111 |
| 7,046,822 | B1 | * | 5/2006 | Knoeppel et al. | 382/103 |
| 2001/0045979 | A1 | * | 11/2001 | Matsumoto et al. | 348/43 |
| 2002/0089583 | A1 | * | 7/2002 | You et al. | 348/42 |
| 2002/0175921 | A1 | * | 11/2002 | Xu et al. | 345/589 |
| 2003/0076407 | A1 | * | 4/2003 | Uchiyama et al. | 348/46 |
| 2005/0100207 | A1 | * | 5/2005 | Konolige | 382/154 |
| 2006/0181767 | A1 | * | 8/2006 | Hanzawa | 359/380 |
| 2006/0192776 | A1 | * | 8/2006 | Nomura et al. | 345/419 |
| 2008/0205791 | A1 | * | 8/2008 | Ideses et al. | 382/285 |
| 2008/0240549 | A1 | * | 10/2008 | Koo et al. | 382/154 |
| 2008/0316299 | A1 | * | 12/2008 | Porwal | 348/46 |
| 2010/0007718 | A1 | * | 1/2010 | Rohaly et al. | 348/46 |
| 2011/0234767 | A1 | * | 9/2011 | Tokiwa | 348/47 |
| 2012/0076484 | A1 | * | 3/2012 | Takada et al. | 396/324 |

FOREIGN PATENT DOCUMENTS

| JP | 3978392 | 9/2007 |
| JP | 4027113 | 12/2007 |

* cited by examiner

*Primary Examiner* — Sath V Perungavoor
*Assistant Examiner* — Peter D Le
(74) *Attorney, Agent, or Firm* — Cowan, Liebowitz & Latman, P.C.

(57) ABSTRACT

A first image nonalignment amount, between a first type image and a second type image captured when the focusing lens is located at an in-focus position, of any subject, that is positioned a predetermined distance from the image capturing apparatus, is obtained. A second image nonalignment amount, between the first type image and the second type image obtained when the focusing lens is located at a predetermined reference position, of the subject is obtained. Then an image shift amount, for at least one of the first type image and the second type image captured when the focusing lens is located at the in-focus position, is determined, so that the difference between the first image nonalignment amount and the second image nonalignment amount falls within a predetermined range.

15 Claims, 9 Drawing Sheets

FIG. 2
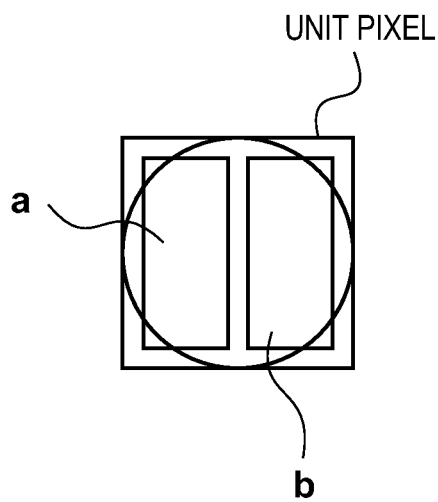
FIG. 3A                    FIG. 3B
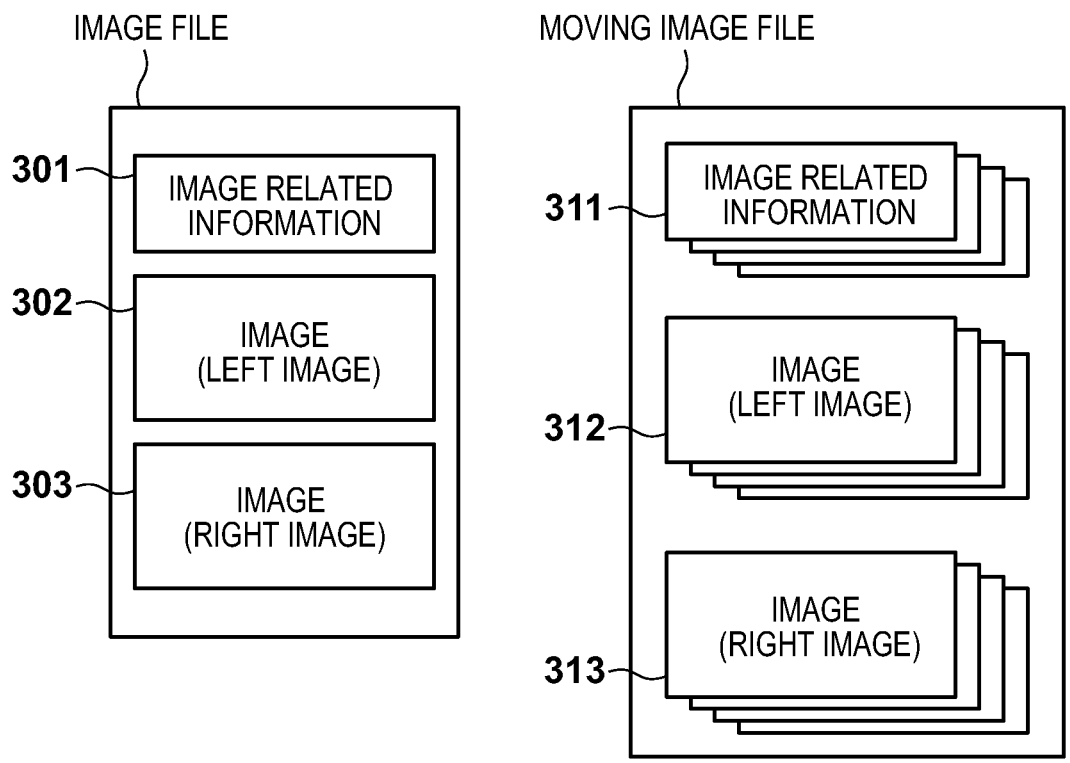

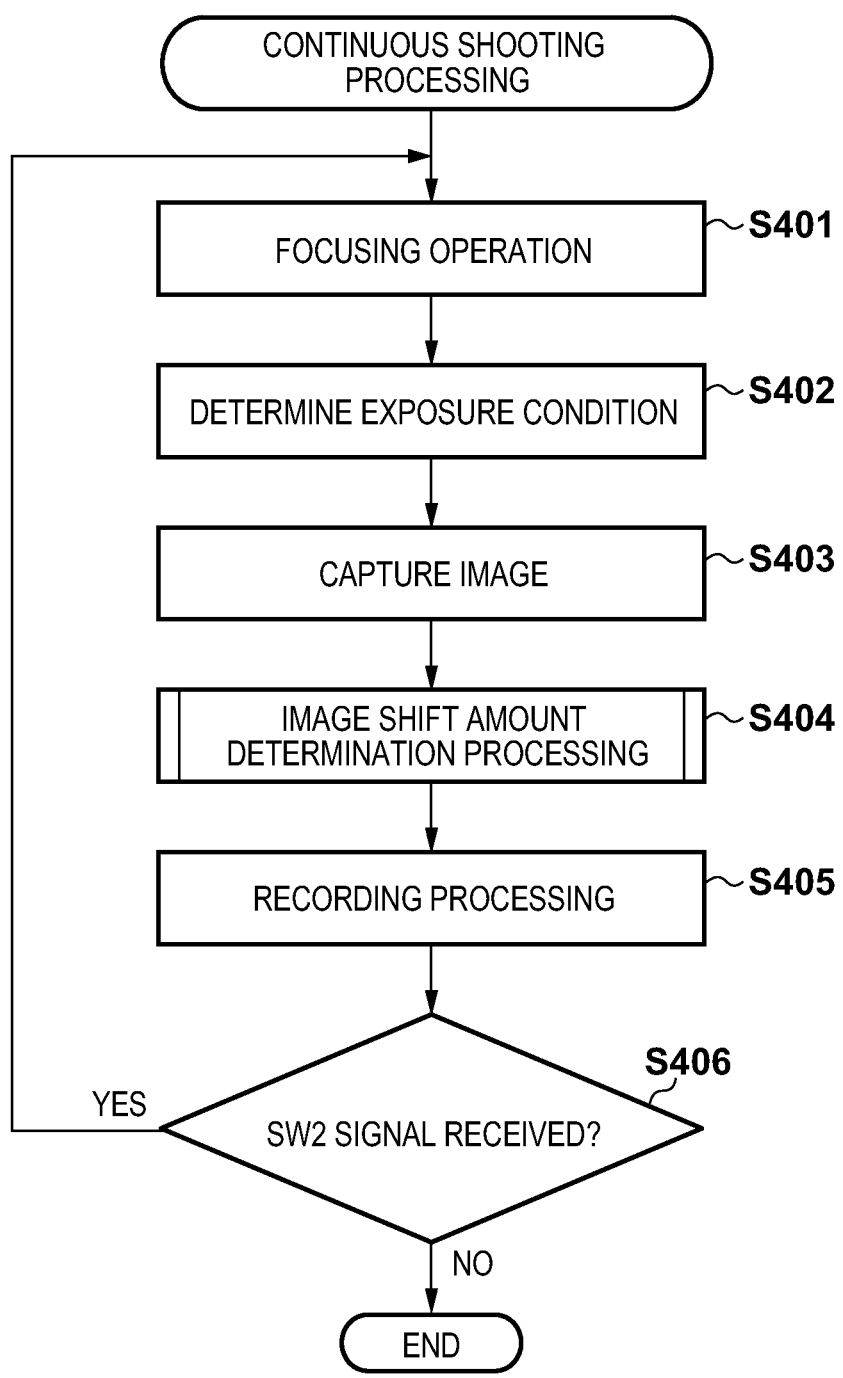

FIG. 5A SUBJECT POSITIONAL RELATIONSHIP (TOP VIEW)
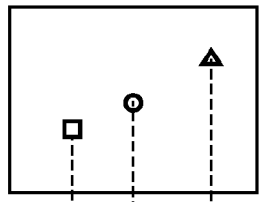
FOR RIGHT EYE
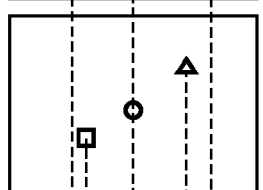
FOR LEFT EYE
IMAGE CAPTURING OUTPUT AT REFERENCE POSITION
FIG. 5B
DISPLAY SURFACE
FIG. 5C
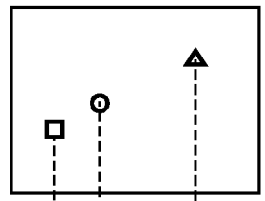
FOR RIGHT EYE
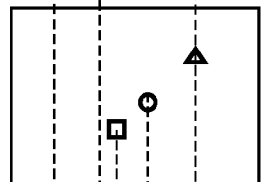
FOR LEFT EYE
IMAGE CAPTURING OUTPUT AT IN-FOCUS POSITION
FIG. 5D
DISPLAY SURFACE
FIG. 5E

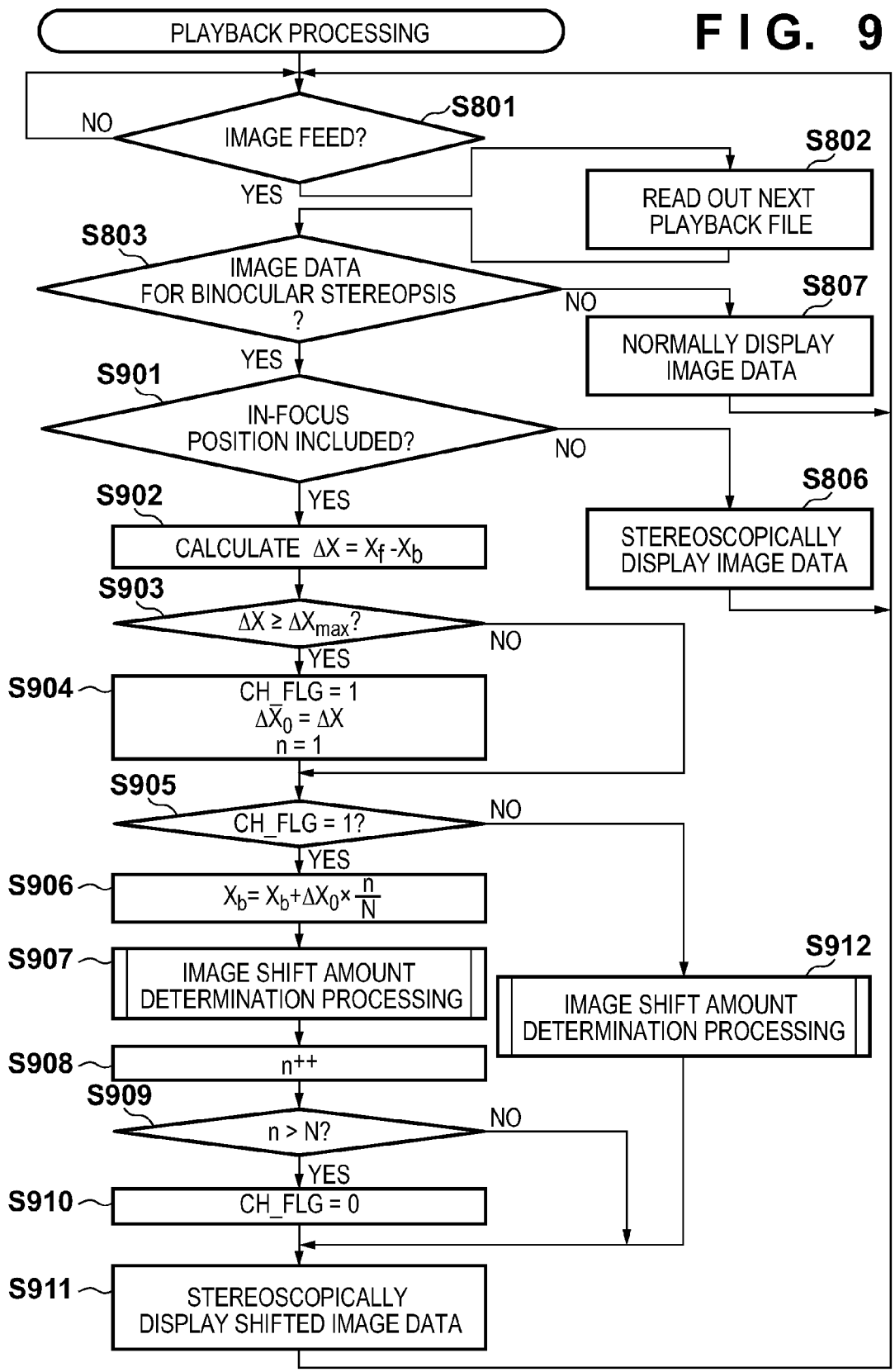

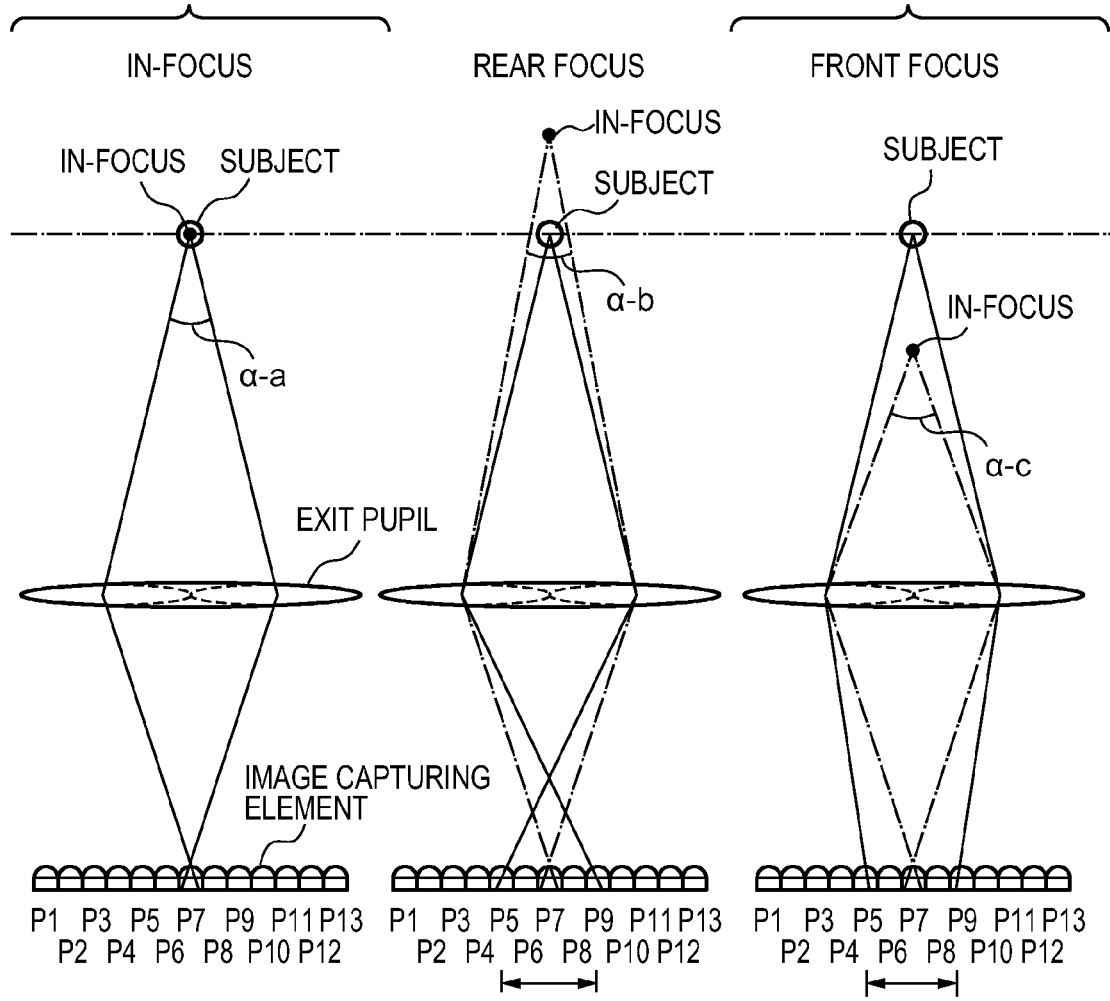

IMAGE CAPTURING APPARATUS, PLAYBACK APPARATUS, CONTROL METHOD, IMAGE CAPTURING SYSTEM AND RECORDING MEDIUM

BACKGROUND OF THE INVENTION

1. Field of the Invention

The present invention relates to an image capturing apparatus, playback apparatus, control method, image capturing system, and recording medium, and particularly to a technique for binocular stereopsis using images for right and left eyes obtained from light beams which have passed through different regions of an exit pupil of an imaging optical system.

2. Description of the Related Art

In recent years, playback apparatuses such as television receivers and mobile phones, each of which has a display device for stereoscopically displaying contents have prevailed. Contents for stereopsis to be displayed by such playback apparatus are not limited to those which are provided by specific providers of television broadcast programs, DVDs, and the like, and contents created by users can be used.

As one method of allowing an observer to perceive a solid, a binocular stereopsis method which allows the observer to perceive a binocular disparity by presenting different images for right and left eyes, which have an image nonalignment amount between them to the right and left eyes of the observer is known. Since most of the aforementioned stereoscopic display devices adopt the binocular stereopsis method, image capturing apparatuses which can capture still images or moving images for stereopsis, each of which includes images for right and left eyes, have also prevailed recently. For example, such image capturing apparatus which can capture images for binocular stereopsis has two imaging optical systems which are disposed to set a base-line length, and outputs images obtained from light beams which have passed through the respective imaging optical systems as those for binocular stereopsis.

On the other hand, when an observer views a content for stereopsis using a stereoscopic display device, a viewing distance (a distance between a display surface and eyeballs of the observer) recommended according to a physical size of a display region is set. This viewing distance is set according to an average horizontal eyesight of users. In most of contents for stereopsis, which are provided by the providers, as described above, an image nonalignment amount between images for right and left eyes of a content is adjusted so that the binocular disparity hardly gives a tired feeling to the observer when that content is viewed at the recommended viewing distance.

However, since a content for stereopsis created by a user may not consider any tired feeling of which the binocular disparity is to be given to an observer, some display devices have a function of adjusting an image nonalignment amount between images for right and left eyes. Japanese Patent No. 3978392 discloses a technique which adjusts a stereoscopic effect given to an observer by determining an image shift amount of images for right and left eyes based on: information of a base-line length of two imaging optical systems: and a distance to an intersection of optical axes of the two imaging optical systems, which are included in images for binocular stereopsis.

Some image capturing apparatuses can capture images for binocular stereopsis using only one imaging optical system in recent years. Japanese Patent No. 4027113 discloses an image capturing apparatus in which each pixel of an image capturing element has a plurality of light-receiving elements, as shown in FIG. 2, and the respective light-receiving elements photoelectrically convert light beams which have passed through different regions of an exit pupil of the imaging optical system, thus capturing images for binocular stereopsis.

However, the image capturing apparatus disclosed in Japanese Patent No. 4027113 does not consider any function of appropriately adjusting an image nonalignment amount between images for right and left eyes.

SUMMARY OF THE INVENTION

The present invention has been made in consideration of the aforementioned conventional problems. The present invention provides a technique which can present images for binocular stereopsis generated from light beams which have passed through different exit pupils of one imaging optical system while reducing an unnatural feeling given to an observer.

According to one aspect of the present invention, there is provided an image capturing apparatus comprising: an image capturing unit configured to capture respective light beams which have passed through different regions of an exit pupil of an imaging optical system and to output a first type image and a second type image respectively corresponding to different light beams; an obtaining unit configured to obtain information of an in-focus position as a driving position of a focusing lens when the image capturing unit captures the first type image and the second type image; a determination unit configured to determine, based on the information of the in-focus position, an image shift amount for at least one of the first type image and the second type image captured when the focusing lens is located at the in-focus position; and a recording unit configured to record the image shift amount determined by the determination unit and the first type image and the second type image, associating them with each other, wherein, the determination unit obtains a first image nonalignment amount, between the first type image and the second type image captured when the focusing lens is located at the in-focus position, of any subject that is positioned a predetermined distance from the image capturing apparatus; the determination unit obtains a second image nonalignment amount, between the first type image and the second type image obtained when the focusing lens is located at a predetermined reference position, of the subject; and the determination unit determines the image shift amount, so that the difference between the first image nonalignment amount and the second image nonalignment amount falls within a predetermined range.

According to another aspect of the present invention, there is provided a playback apparatus comprising: an obtaining unit configured to obtain a first type image and a second type image obtained by capturing respective light beams which have passed through different regions of an exit pupil of an imaging optical system, and information of an in-focus position as a driving position of a focusing lens of the imaging optical system when the images are captured; a determination unit configured to determine, based on the information of the in-focus position, an image shift amount for at least one of the first type image and the second type image obtained by the obtaining unit; and an output unit configured to shift at least one of the first type image and the second type image obtained by the obtaining unit in accordance with the image shift amount determined by the determination unit, and to output the shifted images to a display unit which allows binocular stereopsis, wherein, the determination unit obtains a first image non alignment amount, between the first type image and the second type image obtained by the obtaining unit, of any subject that is positioned a predetermined distance from an image capturing apparatus which captured the images; the determination unit obtains a second image nonalignment amount, between the first type image and the second type image obtained by the image capturing apparatus when the focusing lens is located at a predetermined reference position, of the subject; and the determination unit determines the image shift amount, so that the difference between the first image nonalignment amount and the second image nonalignment amount falls within a predetermined range.

According to still another aspect of the present invention, there is provided a control method of an image capturing apparatus which has an imaging optical system having a focusing lens, the method comprising: an image capturing step of capturing respective light beams which have passed through different regions of an exit pupil of the imaging optical system and outputting a first type image and a second type image respectively corresponding to different light beams; an obtaining step of obtaining information of an in-focus position as a driving position of the focusing lens when the first type image and the second type image are captured in the image capturing step; a determination step of determining, based on the information of the in-focus position, an image shift amount for at least one of the first type image and the second type image captured when the focusing lens is located at the in-focus position; and a recording step of recording the image shift amount determined in the determination step and the first type image and the second type image, associating them with each other, wherein, in the determination step, a first image nonalignment amount, between the first type image and the second type image captured when the focusing lens is located at the in-focus position, of any subject, that is positioned a predetermined distance from the image capturing apparatus, is obtained; a second image nonalignment amount, between the first type image and the second type image obtained when the focusing lens is located at a predetermined reference position, of the subject is obtained; and the image shift amount is determined, so that the difference between the first image nonalignment amount and the second image nonalignment amount falls within a predetermined range.

According to still another aspect of the present invention, there is provided a control method of a playback apparatus, comprising: an obtaining step of obtaining a first type image and a second type image obtained by capturing respective light beams which have passed through different regions of an exit pupil of a single imaging optical system, and information of an in-focus position as a driving position of a focusing lens of the imaging optical system when the images are captured; a determination step of determining, based on the information of the in-focus position, an image shift amount for at least one of the first type image and the second type image obtained in the obtaining step; and an output step of shifting at least one of the first type image and the second type image obtained in the obtaining step in accordance with the image shift amount determined in the determination step, and outputting the shifted images to a display unit which allows binocular stereopsis, wherein, a first image non alignment amount, between the first type image and the second type image obtained by the obtaining unit, of any subject, that is positioned a predetermined distance from an image capturing apparatus which captured the images, is obtained; a second image nonalignment amount, between the first type image and the second type image obtained by the image capturing apparatus when the focusing lens is located at a predetermined reference position, of the subject is obtained; and the image shift amount is determined, so that the difference between the first image nonalignment amount and the second image nonalignment amount falls within a predetermined range.

According to still another aspect of the present invention, there is provided an image capturing system comprising: an image capturing unit configured to capture respective light beams which have passed through different regions of an exit pupil of an imaging optical system and to output a first type image and a second type image respectively corresponding to different light beams; an obtaining unit configured to obtain information indicating an in-focus position as a driving position of a focusing lens when the image capturing unit captures the first type image and the second type image; a determination unit configured to determine, based on the information of the in-focus position, an image shift amount for at least one of the first type image and the second type image captured when the focusing lens is located at the in-focus position; and an output unit configured to shift at least one of the first type image and the second type image captured by the image capturing unit in accordance with the image shift amount determined by the determination unit, and to output the shifted images to a display unit which allows binocular stereopsis, wherein, the determination unit obtains a first image nonalignment amount, between the first type image and the second type image captured when the focusing lens is located at the in-focus position, of any subject that is positioned a predetermined distance from the image capturing apparatus; the determination unit obtains a second image nonalignment amount, between the first type image and the second type image obtained when the focusing lens is located at a predetermined reference position, of the subject; and the determination unit determines the image shift amount, so that the difference between the first image nonalignment amount and the second image nonalignment amount falls within a predetermined range.

Further features of the present invention will become apparent from the following description of exemplary embodiments (with reference to the attached drawings).

BRIEF DESCRIPTION OF THE DRAWINGS

FIG. 2 is a view showing the structure of a unit pixel of an image capturing element according to the embodiment of the present invention;

FIGS. 3A and 3B are views showing the file structures of files recorded by the digital camera 100 according to the embodiment of the present invention;

FIG. 4 is a flowchart showing continuous shooting processing according to the first embodiment of the present invention;

FIGS. 5A, 5B, 5C, 5D, and 5E are views for explaining the concept of image shift amount determination processing according to the embodiment of the present invention;

FIG. 9 is a flowchart of playback processing according to the second embodiment of the present invention; and FIGS. 10A, 10B, and 10C are views for explaining image position image nonalignment caused by a relationship between a distance between a subject to be focused and an image capturing apparatus, and a focal length.

DESCRIPTION OF THE EMBODIMENTS

[First Embodiment]

Figure 1:
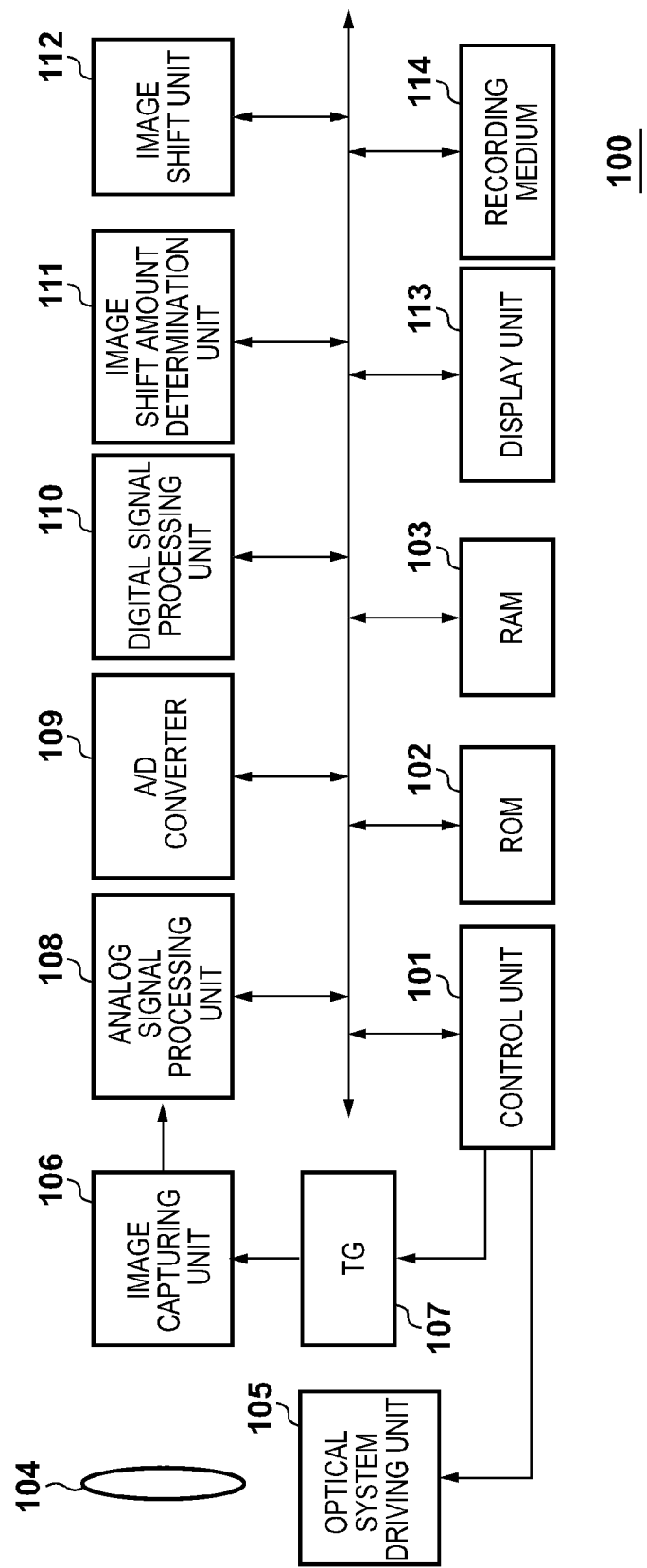
FIG. 1 is a block diagram showing the functional arrangement of a digital camera 100 according to an embodiment of the present invention.

Exemplary embodiments of the present invention will be described in detail hereinafter with reference to the drawings. Note that one embodiment to be described hereinafter will exemplify a case in which the present invention is applied to a digital camera which has a display device that allows binocular stereopsis, and generates images for binocular stereopsis from light beams that have passed through different exit pupils of one imaging optical system, as an example of an image capturing apparatus, playback apparatus, and image capturing system. However, the present invention is applicable to an arbitrary apparatus which can generate images for binocular stereopsis from light beams that have passed through different exit pupils of one imaging optical system, or can play back the images.

<Influence of Focus Adjustment Operation During Stereopsis on Observer>

The influence given to an observer who observes a live-view screen of a stereopsis display during focus adjustment when focus adjustment is performed in a digital camera as an image capturing apparatus will be described below.

In the image capturing method of images for binocular stereopsis described in Japanese Patent No. 4027113, a stereoscopic effect given to an observer changes depending on settings of a focal length, aperture value of an imaging optical system unlike in the method which determines a stereoscopic effect by installation conditions of imaging optical systems for two eyes in the image capturing apparatus described in Japanese Patent No. 3978392. More specifically, a subject which has an image nonalignment amount=0 between images for right and left eyes obtained by the image capturing apparatus of Japanese Patent No. 4027113 is an in-focus subject with which the imaging optical system is in focus, and a stereoscopic effect given to an observer in association with one subject changes depending on a state of the imaging optical system at the shooting timing. This means that a disparity perceived by an observer changes depending on a distance (focal length) between the focal plane of the imaging optical system and the image capturing apparatus at the shooting timing even when a layout relationship between a subject and the image capturing apparatus remains the same.

For example, a case will be examined below wherein a subject is located on the focal plane of the imaging optical system, as shown in FIG. 10A. At this time, in an A image group (image signals obtained from light-receiving elements a: an image for a left eye) and a B image group (image signals obtained from light-receiving elements b: an image for a right eye), which are obtained from an image capturing element having light-receiving elements b and a for right and right eyes in each pixel, images of the subject are formed on a single pixel. That is, positions of images of the in-focus subject located on the focal plane nearly match between the images for the right and left eyes, and are assumed to have no image nonalignment.

By contrast, in a so-called rear-focus state in which the focal length is larger than the distance between the subject to be focused and the image capturing apparatus, as shown in FIG. 10B, the subject is located in front of the focal plane. At this time, between images for the right and left eyes obtained from the image capturing element, positions of images of the subject to be focused have a image nonalignment. More specifically, since the subject is perceived in front of a display surface corresponding to the focal plane when the images are stereoscopically displayed on a display device, an image nonalignment occurs in a (convergence) direction in which the eyeballs of the observer are directed to the center to be smaller than the convergence angle.

Also, in a so-called front-focus state in which the focal length is smaller than the distance between the subject to be focused and the image capturing apparatus, as shown in FIG. 10C, the subject is located behind the focal plane. At this time, between images for the right and left eyes obtained from the image capturing element, positions of images of the subject to be focused have a image nonalignment. More specifically, since the subject is perceived behind a display surface corresponding to the focal plane when the images are stereoscopically displayed on a display device, an image nonalignment occurs in a (divergence) direction in which the eyeballs of the observer are directed outwardly to be larger than the convergence angle.

That is, when the focal length changes frequently by, for example, an AF operation in a still image shooting preparation state or a focus adjustment operation during moving image shooting, and when images captured during such change are continuously presented to a stereoscopic display device, a disparity perceived by the observer also changes frequently. At this time, even when the observer gazes one subject, since the disparity of that subject changes, the eyeballs of the observer have to make focus adjustment so as to gaze the subject. That is, since the focus adjustment of the eyeballs has to be made in correspondence with frequent changes of the focal length, an unnatural feeling is unwantedly given to the observer.

Hence, in this embodiment, an image shift amount between images for the right and left eyes is determined based on information indicating an in-focus position in association with a subject whose distance to the image capturing apparatus matches a predetermined distance. More specifically, the image shift amount is determined so that a difference between a first image nonalignment amount between the shifted images and a second image nonalignment amount between images obtained when a focusing lens is located at a predetermined reference position falls within a predetermined range. Thus, images for binocular stereopsis can be presented while eliminating an unnatural feeling given to the observer.

<Functional Arrangement of Digital Camera 100>

FIG. 1 is a block diagram showing the functional arrangement of a digital camera 100 according to the embodiment of the present invention.

A control unit 101 is, for example, a CPU, and controls operations of respective blocks included in the digital camera 100. More specifically, the control unit 101 controls the operations of the respective blocks by reading out operation programs of continuous shooting processing and playback processing (to be described later) from a ROM 102, expanding the readout programs on a RAM 103, and executing the expanded programs.

The ROM 102 is, for example, a rewritable nonvolatile memory, and stores parameters required for the operations of the respective blocks included in the digital camera 100 and information associated with characteristics of an imaging optical system 104 (to be described later) in addition to the operation programs of the continuous shooting processing and playback processing.

The RAM 103 is a volatile memory, and is used not only as an expansion area of the operation programs of the continuous shooting processing and playback processing, but also as a storage area required to temporarily store intermediate data and the like, which are output during the operations of the respective blocks included in the digital camera 100.

Note that the following description of this embodiment will be given under the assumption that processes are implemented by the respective blocks included in the digital camera 100 as hardware. However, the present invention is not limited to such specific embodiment, and the processes of the respective blocks may be implemented by programs which execute the same processes as the respective blocks.

An image capturing unit 106 is, for example, an image capturing element such as a CCD or CMOS sensor. The image capturing unit 106 photoelectrically converts an optical image formed on the image capturing element by the imaging optical system 104, and outputs an obtained analog image signal to an analog signal processing unit 108. The image capturing unit 106 photoelectrically converts an optical image in accordance with timing signals such as HD and VD output from a TG 107 controlled by the control unit 101. Assume that one pixel of the image capturing element of the image capturing unit 106 of this embodiment includes two light-receiving elements b and a for right and left eyes, as shown in FIG. 2. However, the number of light-receiving elements included in one pixel is not limited to this, and one pixel may include two or more light-receiving elements and may output image signals associated with images for the right and left eyes. The imaging optical system 104 includes a lens group including at least a focusing lens, and an aperture in this embodiment. Driving of the focusing lens and aperture included in the imaging optical system 104 is controlled by an optical system driving unit 105.

The analog signal processing unit 108 has a CDS circuit required to remove noise generated on a transmission path of the image capturing element, a nonlinear amplifier circuit, and the like. The analog signal processing unit 108 applies signal processing to the input analog image signal using respective circuits, and outputs the obtained analog signal to an A/D converter 109. The A/D converter 109 applies A/D conversion processing to the analog signal output from the analog signal processing unit 108 to convert it into a digital image signal. The A/D converter 109 outputs the digital image signal obtained by the conversion to a digital signal processing unit 110. The digital signal processing unit 110 applies signal correction processing such as defective pixel correction, white balance adjustment, and gamma adjustment, and image processing such as noise reduction processing to the input digital image signal. In this embodiment, the digital signal processing unit 110 separates the digital image signal into a signal of an image for the left eye (first image) and that of an image for the right eye (second image). Assume that the signals separated into images for the right and left eyes are stored in, for example, the RAM 103.

The digital signal processing unit 110 encodes the signals of the images for the right and left eyes in a predetermined recording format, and outputs an obtained image file or frame data of a moving image file to a recording medium 114 (to be described later). In this embodiment, assume that the image file and moving image file respectively have the file structures shown in FIGS. 3A and 3B. More specifically, the image file includes image related information 301, an image 302 for the left eye, and an image 303 for the right eye, as shown in FIG. 3A. Also, the moving image file includes image related information 311, a frame image 312 for the left eye, and a frame image 313 for the right eye for each frame as in the image file, as shown in FIG. 3B. Note that the file structures of the image and moving image are not limited to those, and are different depending on recording formats, as is easily understood.

A display unit 113 is a display device which displays images for the right and left eyes to allow binocular stereopsis. The display unit 113 presents corresponding images to the right and left eyes of a user using, for example, optical members such as lenticular lenses. Note that the following description of this embodiment will be given under the assumption that the display device included in the digital camera 100 uses the aforementioned method that allows naked-eye stereopsis. However, the device for displaying images for the right and left eyes generated by the digital camera 100 of the present invention is not limited to this. For example, the display device may adopt a method which alternately and time-divisionally presents images for the right and left eyes and in which an observer wears spectacles using liquid crystal shutters for the right and left eyes which are switched to a transparent state in synchronism with switching of the images like in a so-called 3D television for home use recently.

An image shift amount determination unit 111 determines an image shift amount as a relative position nonalignment of images upon displaying images for the right and left eyes on the display unit 113. Then, an image shift unit 112 generates display images by shifting a position of at least one of images for the right and left eyes when it is displayed on the display device by the image shift amount determined by the image shift amount determination unit 111. The "image shift amount" is a numeric value indicating, using a pixel unit, a distance amount between image centers of images for the right and left eyes when the images for the right and left eyes are displayed on a display region of the display unit 113 in this embodiment. By changing the image shift amount in this way, an image nonalignment amount of each subject between the images for the right and left eyes can be adjusted. Since a subject free from any image nonalignment amount is perceived as if it were present on the display surface of the display device, the stereoscopic effect of the images for the right and left eyes can be adjusted by adjusting the image nonalignment amount. Assume that in this embodiment, information indicating the image shift amount determined by the image shift amount determination unit 111 is recorded while being included in the image related information of the image file or moving image file recorded in the recording medium 114. Especially, in case of the moving image file, information indicating the image shift amount determined by the image shift amount determination unit 111 is recorded for each frame.

The recording medium 114 is, for example, an internal memory included in the digital camera 100 or a recording device such as a memory card or HDD, which is detachably connected to the digital camera 100. The recording medium 114 records the image file or moving image file obtained by the image capturing processing.

<Continuous Shooting Processing>

The continuous shooting processing of the digital camera 100 of this embodiment will be practically described below with reference to the flowchart shown in FIG. 4. The processing corresponding to this flowchart can be implemented when the control unit 101 reads out a corresponding processing program stored in, for example, the ROM 102, expands the readout program on the RAM 103, and executes the expanded program. Note that the following description will be given under the assumption that this continuous shooting processing is started when the control unit 101 receives a control signal (SW2) indicating shooting start, which is output in response to, for example, an operation of a release button (not shown) included in the digital camera 100 by the user.

Assume that in this embodiment, the digital camera 100 is set in a continuous shooting mode, and performs an autofocus operation (continuous AF) and an AE operation for determining exposure conditions via photometry of a subject every time an image is captured during an interval in which images are repetitively captured by continuous shooting. That is, each of continuous images obtained by the continuous shooting of the digital camera 100 is captured by referring to an image obtained by preliminary shooting or an image obtained before current shooting during the continuous shooting, and performing the AF and AE operations in correspondence with a subject image included in that image.

In step S401, the control unit 101 determines a driving position (in-focus position) of the focusing lens focused on a subject. More specifically, the control unit 101 obtains, from the RAM 103, one of image data for the right and left images such as image data obtained by preliminary shooting (not shown) or image data already captured during the continuous shooting, which were obtained before execution of this step. Then, the control unit 101 determines the driving position of the focusing lens from a contrast state of a subject image included in the obtained image data. The control unit 101 transfers the determined driving position of the focusing lens to the optical system driving unit 105, and controls the optical system driving unit 105 to drive the focusing lens of the imaging optical system 104 to that driving position. At this time, assume that the control unit 101 stores information indicating the determined driving position of the focusing lens in the RAM 103.

In step S402, the control unit 101 determines exposure conditions (shutter speed and aperture value) at the shooting timing based on a photometry result of a subject obtained by a photometry unit (not shown). At this time, assume that the control unit 101 stores information indicating the determined exposure conditions in the RAM 103. Note that the following description of this embodiment will be given under the assumption that the exposure conditions determined during the continuous shooting are constant, for the sake of simplicity.

In step S403, the control unit 101 captures images for stereopsis under the exposure conditions determined in step S402. More specifically, the control unit 101 reads out an analog image signal captured by the image capturing unit 106, and controls the analog signal processing unit 108, A/D converter 109, and digital signal processing unit 110 to perform various image processes, thereby generating images to be recorded for the right and left eyes. Note that the generated images to be recorded for the right and left eyes are temporarily stored in the RAM 103.

In step S404, the control unit 101 executes image shift amount determination processing for determining an image shift amount upon displaying the images to be recorded for the right and left eyes on the display device.

(Concept of Image Shift Amount Determination Processing)

The concept of the image shift amount determination processing executed in this step will be described below with reference to FIGS. 5A to 5E.

For example, a case will be examined below wherein a main subject 501, distant-view subject 502, and near-view subject 503 are located with respect to the digital camera 100, as shown in FIG. 5A. Assume that the focusing lens included in the imaging optical system 104 of the digital camera 100 is set at a reference position focused on the main subject 501.

When the main subject 501 is focused, images are obtained by shooting, as shown in FIG. 5B. At this time, images of the in-focus main subject 501 are free from any image nonalignment between images for the right and left eyes. That is, when images for the right and left eyes obtained when the main subject 501 is focused are stereoscopically displayed on the display device, the main subject 501 is perceived as if it were located at a position on the display surface, as shown in FIG. 5C. That is, a distance sense given to the observer in association with the display surface corresponds to the distance (focal length) between the main subject 501 and digital camera 100.

A case will be examined below wherein the main subject 501 temporarily moves from this state in the direction of the digital camera 100 and then returns to the state shown in FIG. 5A. At this time, since a contrast state in a captured image changes due to movement of the in-focus main subject 501, the control unit 101 performs the AF operation in step S401 to detect an in-focus position of the focusing lens again. More specifically, the control unit 101 determines the driving position of the focusing lens to be focused on the main subject 501 after movement in a high contrast state while driving the focusing lens back and forth with respect to the current driving position of the focusing lens (wobbling operation).

When the images for the right and left eyes obtained by shooting are stereoscopically displayed during this wobbling operation, a distance sense given to the observer in association with the display surface changes continuously. A case will be examined below wherein the focusing lens is driven by the wobbling operation to a driving position to be focused on the distant-view subject 502 which is located to be farther than the focal length before the AF operation. In images for the right and left eyes obtained at this time, image nonalignment amounts of the main subject 501 and near-view subject 503 become large, and that of the distant-view subject 502 becomes small (becomes zero), as shown in FIG. 5D. When the images for the right and left eyes shown in FIG. 5D are displayed on the stereoscopic display device, the distant-view subject 502 is perceived by the observer as if it were located at the position on the display surface in place of the main subject 501, as shown in FIG. 5E. That is, although the convergence angle the eyeballs of the observer make remains unchanged from a state on the display surface, since the general stereoscopic effect changes frequently in correspondence with a change in focal length during the AF operation, an unnatural feeling is given to the observer.

For this reason, according to this embodiment, when the AF operation which changes the driving position of the focusing lens in this way is performed, the control unit 101 stores the driving position of the focusing lens immediately before the AF operation as a reference position. Then, the control unit 101 determines an image shift amount of at least one of the images for the right and left eyes obtained during the operation, so that the image nonalignment amount of a subject whose distance to the digital camera 100 matches a predetermined distance immediately before the AF operation is the same as that during the AF operation. Assume that the digital camera 100 of this embodiment stores, in the ROM 102, information of focal lengths to the focal plane when the focusing lens is located at respective driving positions of the focusing lens in association with these driving positions. Then, the control unit 101 obtains information of a focal length corresponding to the reference position from the ROM 102, and determines an image shift amount of the images for the right and left eyes captured when the focusing lens is located at an in-focus position, so that the image nonalignment amount of a subject located at that focal length after shift becomes zero. In this way, since the images can be displayed on the display device so that the image nonalignment amount of the main subject 501 becomes zero even during the AF operation as shown in FIG. 5C, the images for the right and left eyes captured during the AF operation can be presented without changing a stereoscopic effect perceived by the observer.

Note that the image shift amount may be a value used to shift one of the images for the right and left eyes since an image of an identical subject in the images for the right and left eyes need only be displayed while being shifted by the number of pixels corresponding to the image shift amount when that image is displayed on the display device. Alternatively, the image shift amount may be a value used to shift images of an identical subject by the number of pixels corresponding to the image shift amount when both the images are shifted and are finally displayed on the display device.

The following description of this embodiment will be given under the assumption that the driving position of the focusing lens immediately before the AF operation is stored as the reference position. However, the reference position setting method is not limited to this. The reference position may assume a predetermined fixed value or may be a driving position, which is set by the user before the AF operation is performed.

Assume that in this embodiment, a focal length when the focusing lens is located at the reference position is obtained, and an image shift amount of images for the right and left eyes, which are captured when the focusing lens is located at an in-focus position, is determined so that an image nonalignment amount for a subject located at that focal length becomes zero. However, the image shift amount determination method is not limited to this. For example, an image nonalignment amount for a subject whose distance to the digital camera 100 matches a predetermined distance may be used as a determination criterion of the image shift amount. More specifically, an image shift amount may be determined so that when images for the right and left eyes captured when the focusing lens is located at an in-focus position are shifted according to an image shift amount, a difference between an image nonalignment amount for the subject at the predetermined distance (first image nonalignment amount) and an image nonalignment amount when the focusing lens is located at the reference position (second image nonalignment amount) falls within a predetermined disparity change range within which an unnatural feeling due to a change in stereoscopic effect is assumed not to be given to the observer.

(Image Shift Amount Determination Processing)

Figure 6:
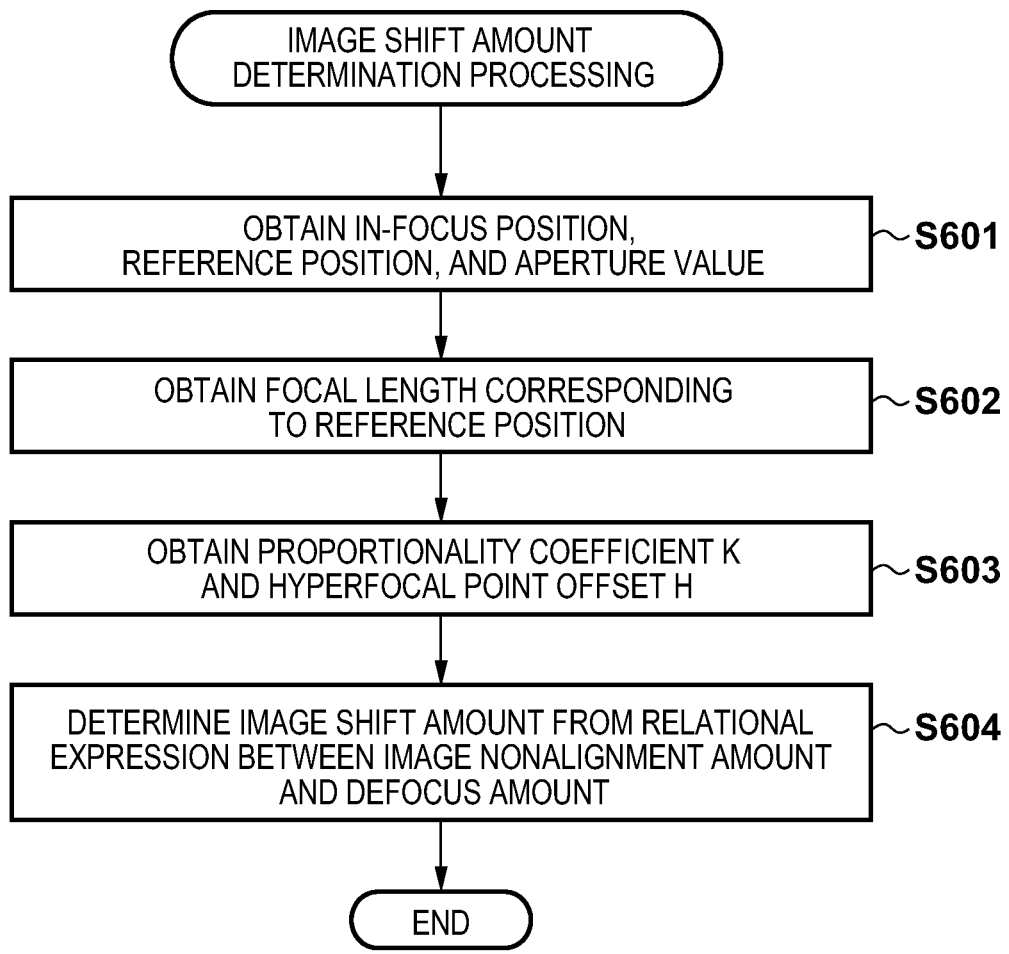
FIG. 6 is a flowchart of the image shift amount determination processing according to the embodiment of the present invention.

Practical processing contents of the image shift amount determination processing executed in step S404 will be described in detail below with reference to the flowchart shown in FIG. 6.

In step S601, the control unit 101 reads out information indicating the driving position (in-focus position) of the focusing lens determined in step S401 and information indicating the predetermined reference position from the RAM 103, and transfers these pieces of information to the image shift amount determination unit 111. Also, the control unit 101 similarly reads out information of the aperture value determined in step S402 from the RAM 103, and transfers that information to the image shift amount determination unit 111. Assume that as the information indicating the reference position, information of the driving position of the focusing lens before the AF operation is performed is stored in the RAM 103 by the control unit 101 before, for example, execution of the shooting processing, as described above.

In step S602, the image shift amount determination unit 111 obtains information of a focal length $X_b$ when the focusing lens is located at the reference position from the ROM 102 under the control of the control unit 101. As described above, assume that in this embodiment, information indicating a distance between a focal plane at each driving position of the focusing lens and the digital camera 100 is stored in the ROM 102 as a focal length management table in association with that driving position.

Figure 7A:
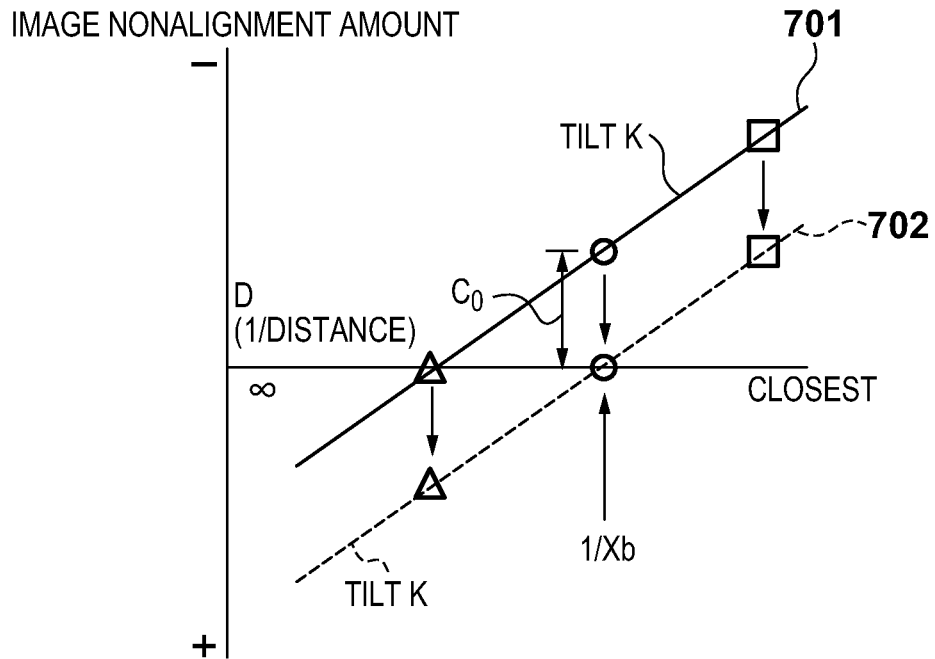
FIGS. 7A and 7B are views for explaining an image shift amount determination method according to the embodiment of the present invention.

In step S603, the image shift amount determination unit 111 obtains, from the ROM 102, parameters (proportionality coefficient K and hyperfocal point offset H) of a relational expression between a defocus amount and an image nonalignment amount between images for the right and left eyes when the focusing lens is located at the in-focus position under the control of the control unit 101. As indicated by a solid line 701 in FIG. 7A, an image nonalignment amount C of a subject between images for the right and left eyes (a convergence direction is positive, and a divergence direction is negative) has a proportional relation with a defocus amount D as a reciprocal of the distance from the digital camera 100. That is, the relational expression between the defocus amount D and image nonalignment amount C can be described by:

$$D = K \times C + H (C = (D-H)/K)$$

Figure 7B:
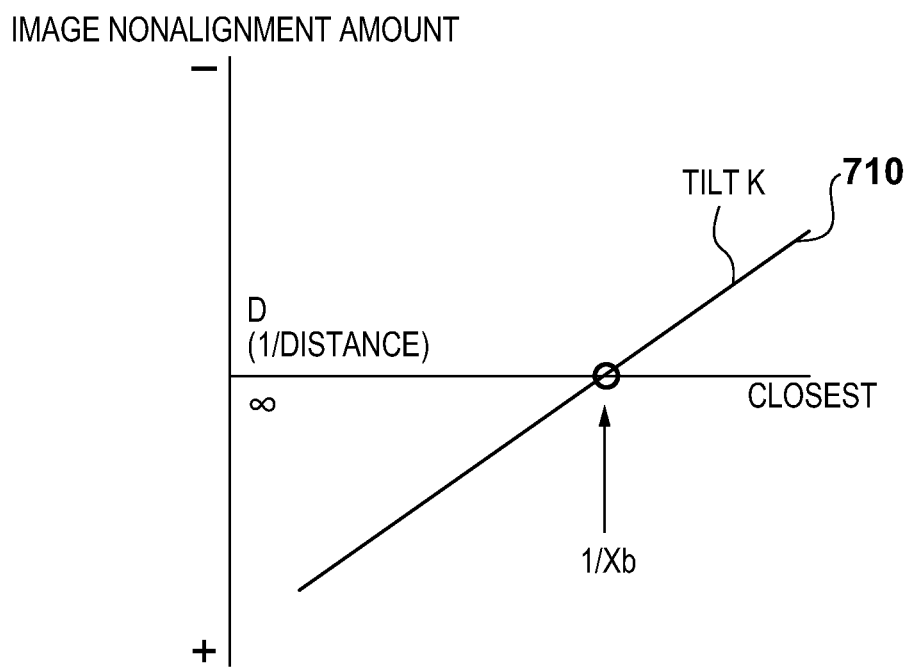

Note that a solid line 710 in FIG. 7B similarity represents the relation between a defocus amount $D_b$ and image nonalignment amount $C_b$ when the focusing lens is located at the reference position. At this time, an image nonalignment amount becomes zero at a defocus amount $1/X_b$ as a reciprocal of a focal length $X_b$ when the focusing lens is located at the reference position.

Assume that since the proportionality coefficient K is a value, which changes depending on an aperture value of the imaging optical system 104 and is unique to the imaging optical system 104, it is stored in the ROM 102 in association with the aperture value in this embodiment. However, the obtaining method of the proportionality coefficient K is not limited to this. For example, shooting is done using an aperture value of actual shooting in association with two driving positions of the focusing lens at the time of preliminary shooting, and the proportionality coefficient K may be calculated using an image nonalignment amount c of obtained images, a distance d between the two driving positions of the focusing lens, and the hyperfocal point offset H, as described by:

$$K = (d-H)/c$$

In step S604, the image shift amount determination unit 111 determines an image shift amount of at least one of images for the right and left eyes captured when the focusing lens is located at an in-focus position, and transfers information of the determined image shift amount to the control unit 101. More specifically, the image shift amount determination unit 111 obtains an image nonalignment amount $C_0$ at the focal length $X_b$ when the focusing lens is located at the reference position in step S602 using the relational expression between the defocus amount D and image nonalignment amount C when the focusing lens is located at the in-focus position obtained in step S603. The image nonalignment amount $C_0$ obtained at this time indicates that between images for the right and left eyes captured when the focusing lens moves to the in-focus position in association with a subject located at the focal length $X_b$. That is, by setting a value obtained by inverting the sign of the image nonalignment amount $C_0$ as an image shift amount, images for the right and left eyes can be displayed so that the observer perceives the same stereoscopic effect as that when the focusing lens is located at the reference position, as indicated by a broken line 702 in FIG. 7A.

After the image shift amount is determined by the image shift amount determination processing in this way, the control unit 101 advances the process to step S405.

In step S405, the control unit 101 obtains the image data to be recorded for the right and left eyes, which are generated in step S403, from the RAM 103, and records an image file including image related information, which includes the determined image shift amount, and the image data in the recording medium 114.

The control unit 101 judges in step S406 if an SW2 signal indicating shooting start is received. If the control unit 101 judges that the SW2 signal is received, the process returns to step S401; otherwise, this continuous shooting processing ends.

In this way, the image file can include information required to present images for the right and left eyes with a constant stereoscopic effect to be perceived, so as not to give an unnatural feeling to the observer when images for stereopsis obtained by the continuous shooting are to be continuously played back.

<Playback Processing>

Figure 8:
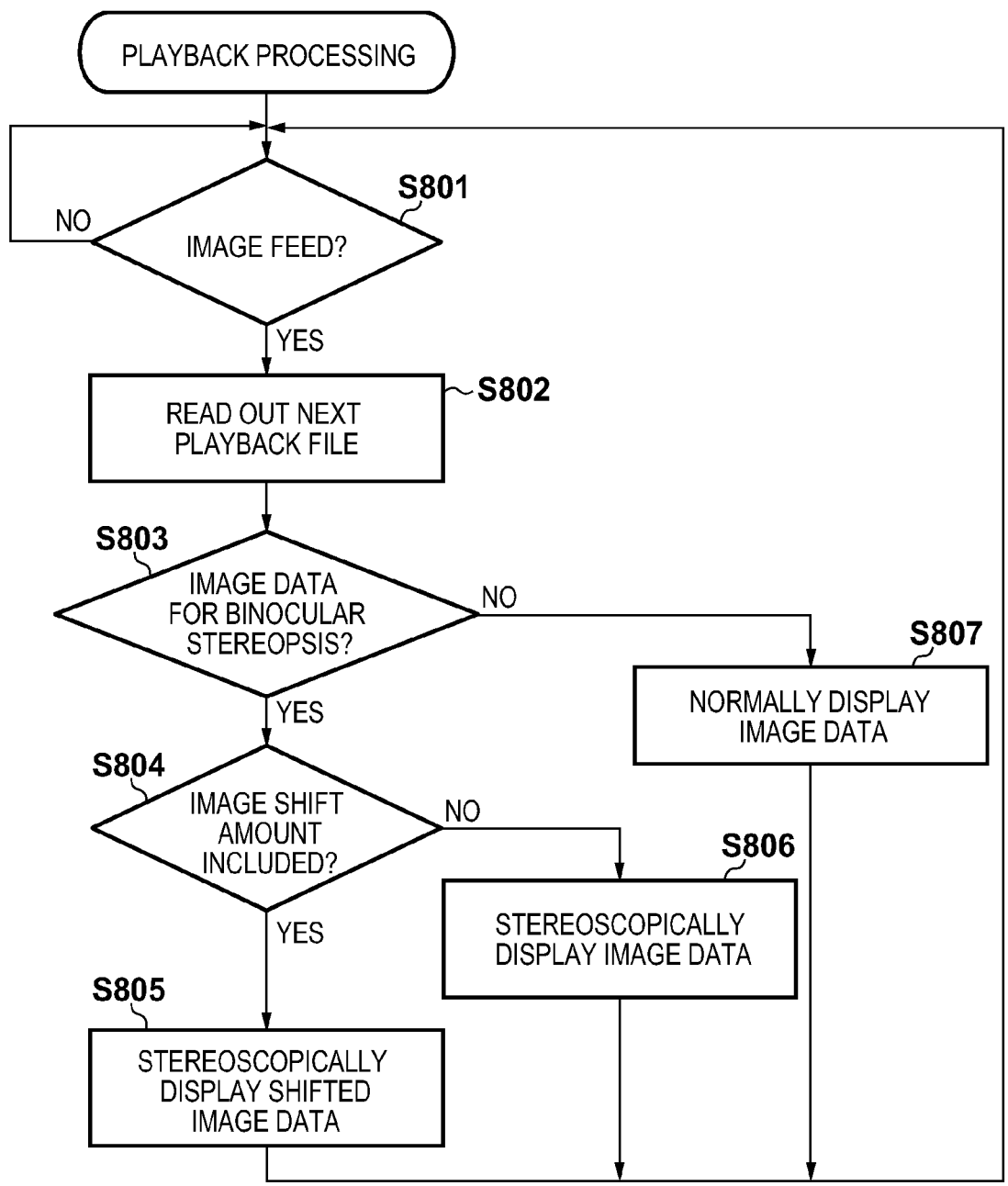
FIG. 8 is a flowchart of playback processing according to the first embodiment of the present invention.

Playback processing executed when the user (observer) browses continuously captured images, which are obtained by the aforementioned continuous shooting processing, in a browse mode of the digital camera 100 will be practically described below with reference to the flowchart shown in FIG. 8. The processing corresponding to this flowchart can be implemented when the control unit 101 reads out a corresponding processing program stored in, for example, the ROM 102, expands the readout program on the RAM 103, and executes the expanded program. Note that the following description will be given under the assumption that this playback processing is started when, for example, the mode of the digital camera 100 is switched to the browse mode.

Note that this embodiment will exemplify a case in which images obtained by the continuous shooting processing are to be browsed in the browse mode. Alternatively, this playback processing is applicable to a case in which the images are played back on a live-view screen displayed on the display unit 113 during the continuous shooting or on an external device.

The control unit 101 judges in step S801 whether or not the user has operated an image feed button (not shown) included in the digital camera 100. More specifically, the control unit 101 judges whether or not a control signal, which indicates that an image feed operation has been performed and is output in response to the operation of the image feed button, is received. If the control unit 101 judges that the image feed operation has been performed, the process advances to step S802; otherwise, the process of this step is repeated.

In step S802, the control unit 101 reads out a next image file to be played back in the currently set playback order from the recording medium 114. Assume that pieces of information of the currently set playback order and an image file which is currently played back are stored in, for example, the RAM 103, and the control unit 101 specifies the next image file to be played back with reference to these pieces of information.

The control unit 101 judges in step S803 whether or not image data included in the readout image file are those for binocular stereopsis. More specifically, the control unit 101 judges whether or not, for example, a header part of the readout image file includes information indicating that the image data included in the image file are those for binocular stereopsis, thereby judging whether or not the image data included in the image file are those for binocular stereopsis. If the control unit 101 judges that the image data included in the next image file to be played back are those for binocular stereopsis, the process advances to step S804; if it judges that the image data included in the image file is not image data for binocular stereopsis (monaural image), the process advances to step S807.

The control unit 101 judges in step S804 whether or not image related information in the next image file to be played back includes information of an image shift amount. If the control unit 101 judges that the image related information includes information of an image shift amount, the process advances to step S805; otherwise, the process advances to step S806.

In step S805, the control unit 101 reads out the information of the image shift amount from the image related information of the next image file to be played back, shifts image data for the right and left eyes in accordance with the image shift amount, and stereoscopically displays these images on the display unit 113. More specifically, the control unit 101 transfers the image data for the right and left eyes and the information of the image shift amount to the image shift unit 112, and controls the image shift unit 112 to shift the image data for the right and left eyes by the image shift amount. Then, the control unit 101 transfers the shifted image data for the right and left eyes to the display unit 113 to stereoscopically display them. Then, the process returns to step S801.

If the control unit 101 judged in step S804 that the image related information of the next image file to be played back does not include any information of an image shift amount, the control unit 101 transfers the image data for the right and left eyes included in the next image file to be played back to the display unit 113 without shifting these image data in step S806. Then, the control unit 101 stereoscopically displays the image data on the display unit 113, and the process returns to step S801.

If the control unit 101 judged in step S803 that the image data included in the next image file to be played back is not image data for binocular stereopsis, the control unit 101 transfers the image data to the display unit 113 to display it in a normal display method which is not stereopsis in step S807. Then, the process returns to step S801. Note that at this time, when the display mode of the display unit 113 is set for stereopsis, the control unit 101 need only display one image data included in the image file as those for the right and left eyes on the display unit 113 without shifting them.

In this manner, images for stereopsis, which are continuously captured in the aforementioned continuous shooting processing can be displayed while being shifted according to their image shift amounts. That is, even when the images to be played back are continuously switched, they can be played back while eliminating an unnatural feeling given to the observer by setting a constant stereoscopic effect to be perceived by the observer.

Note that the continuous shooting processing and playback processing have been described. However, the present invention is not limited to such specific embodiment. The present invention is applicable to an image capturing apparatus or playback apparatus, which is assumed to continuously play back images for stereopsis obtained by the continuous shooting (for example, moving image shooting, display of a live-view screen, etc.). More specifically, the present invention can eliminate an unnatural feeling given to the observer by adjusting an image shift amount of at least one of images for the right and left eyes when images for stereopsis are continuously presented to the observer.

In the description of this embodiment, the image related information including a value of an absolute image shift amount is recorded. However, the image shift amount recording method is not limited to this. For example, in case of, for example, moving image data, a value of an image shift amount may be included as a relative value with respect to an image shift amount of an immediately preceding frame.

In the playback processing of this embodiment, the image shift unit 112 performs only the shift operation of images to be displayed, as described above. However, in practice, the image shift unit 112 may perform enlargement/reduction processing in correspondence with a change in image magnification due to a change of the imaging optical system 104. It is desired to store enlargement/reduction factors used in this enlargement/reduction processing in advance in, for example, the ROM 102 since they are normally unique to the imaging optical system 104.

As described above, the image capturing apparatus of this embodiment can present images for binocular stereopsis, which are generated from light beams that have passed through different exit pupils of one imaging optical system while eliminating an unnatural feeling given to the observer. More specifically, the image capturing apparatus obtains information indicating an in-focus position as the driving position of the focusing lens when images for the right and left eyes are captured. Then, the image capturing apparatus determines an image shift amount of at least one of the images for the right and left eyes captured when the focusing lens is located at that in-focus position, and records the determined image shift amount in association with the images for the right and left eyes. At this time, the image shift amount is determined so that a difference, between: the first image nonalignment amount, between the shifted images, of any subject that is positioned a predetermined distance from the image capturing apparatus: and the second image nonalignment amount, between images for the right and left eyes captured when the focusing lens is located at the predetermined reference position, of the subject, falls within the predetermined range.

[Second Embodiment]

Note that the aforementioned first embodiment has explained the case in which captured images are recorded as an image file together with image related information including an image shift amount for at least one of images for the right and left eyes. That is, in the description of the first embodiment, when images for the right and left eyes are captured, an image shift amount is determined by executing the image shift amount determination processing during processing for recording the images, and is recorded in the file together with the images. This embodiment will explain an aspect in which the image shift amount determination processing is executed at the playback timing of images for stereopsis in place of the recording timing of the captured images for stereopsis (for example, the continuous shooting processing of the first embodiment).

Note that the following description will be given under the assumption that in each image file which records images for stereopsis obtained by continuous shooting, information indicating at least a driving position of the focusing lens at the shooting timing is recorded to be included in image related information.

<Playback Processing>

Playback processing executed when the user (observer) browses images, which are continuously captured by the digital camera 100 having the same arrangement as the aforementioned first embodiment, in a browse mode of the digital camera 100 will be practically described below with reference to the flowchart shown in FIG. 9. The processing corresponding to this flowchart can be implemented when the control unit 101 reads out a corresponding processing program stored in, for example, the ROM 102, expands the readout program on the RAM 103, and executes the expanded program. Note that following description will be given under the assumption that this playback processing is started, for example, when the mode of the digital camera 100 is switched to the browse mode.

Note that in this playback processing, the same step numbers denote steps which perform the same processes as those in the playback processing of the aforementioned first embodiment, a description thereof will not be repeated, and only characteristic steps of this embodiment will be explained.

If the control unit 101 judged in step S803 that image data included in the next image file to be played back are those for binocular stereopsis, the control unit 101 advances the process to step S901. The control unit 101 judges in step S901 whether or not information indicating a driving position (in-focus position $X_f$) of the focusing lens at the shooting timing of image data for binocular stereopsis included in the next image file to be played back is included in image related information of that image file. If the control unit 101 judges that the information indicating the in-focus position $X_f$ is included in the image related information, the process advances to step S902; otherwise, the process advances to step S806.

In step S902, the control unit 101 reads out information indicating a predetermined reference position $X_b$ from the RAM 103. Then, the control unit 101 calculates a difference $\Delta X$ ($=X_f-X_b$) between the in-focus position $X_f$ obtained in step S901 and the predetermined reference position $X_b$.

Note that the following description of this embodiment will be given under the assumption that as for the information indicating the reference position, when the control 101 plays back image files in the currently set playback order, if the playback is switched from an image file, which does not include any information indicating an in-focus position, to another image file, which includes that information, the control unit 101 stores the in-focus position in the RAM 103 as a reference position. However, the storage method of information indicating the reference position is not limited to this. The information indicating the reference position may be included in, for example, an image file. Also, as the information indicating the reference position, in case of, for example, a moving image file or an associated image file group obtained by continuous shooting, an in-focus position in a first frame of the file or a first image file may be used. Also, a favorite value can be set by the user. That is, the information indicating the reference position may be stored according to rules determined according to embodiments.

The control unit 101 judges in step S903 whether or not the difference $\Delta X$ between the in-focus position $X_f$ and reference position $X_b$ is equal to or larger than a threshold used to determine whether or not to set an image nonalignment amount of a subject located at a focal length when the focusing lens is located at the reference position to be zero.

In the description of the aforementioned first embodiment, an image nonalignment amount between images for the right and left eyes captured when the focusing lens is located at the in-focus position is set to be zero in association with a subject located at a focal length when the focusing lens is located at the reference position, thus allowing the observer to perceive a given stereoscopic effect. However, as the difference between the reference position and in-focus position becomes larger, an image shift amount required to shift at least one of images for the right and left eyes captured when the focusing lens is located at the in-focus position increases, so as to allow the observer to perceive a given stereoscopic effect. That is, as the image shift amount becomes larger, since an overlapping region of two images is reduced upon stereoscopically displaying the images for the right and left eyes, only a limited range smaller than captured images is consequently stereoscopically presented to the observer.

For this reason, it is desirable to determine the minimum number of pixels of a stereoscopically displayed region so as to prevent that region from becoming too small with respect to the sizes of captured images for the right and left eyes. That is, an image shift amount with which the number of pixels of the stereoscopically displayed region when the shifted images for the right and left eyes are stereoscopically displayed on the display unit 113 is less than the minimum number of pixels is excluded.

In this embodiment, in accordance with the difference between the in-focus position and reference position, a method of calculating an image shift amount used when images for the right and left eyes captured when the focusing lens is located at the in-focus position are stereoscopically displayed on the display unit 113 is switched. In the digital camera 100 of this embodiment, assume that a threshold for the difference between the driving position of the focusing lens and the reference position is stored in the ROM 102 in association with each combination of the aperture value of the imaging optical system 104 and the reference position. The threshold is set to be a value which prevents the number of pixels of a region displayed to allow binocular stereopsis after the shift operation from being equal to or smaller than the minimum number of pixels when an image nonalignment amount between images for the right and left eyes captured when the focusing lens is located at the in-focus position is set to be zero in association with a subject located at a focal length when the focusing lens is located at the reference position.

Note that the following description of this embodiment will be given under the assumption that the threshold is set for each combination of the aperture value and reference position. However, the threshold setting method is not limited to this. The threshold may assume a fixed value independently of the aperture value and reference position, or may be set to be different values depending on whether the difference between the in-focus position and reference position has the positive or negative sign.

The control unit 101 judges in this step whether or not the difference $\Delta X$ between the in-focus position $X_f$ and reference position $X_b$ is equal to or larger than a threshold $\Delta X_{max}$, which is determined in advance in association with the current state of the imaging optical system 104. If the control unit 101 judges that the difference between the in-focus position and reference position is equal to or larger than the threshold, the process advances to step S904; otherwise, the process jumps to step S905.

In step S904, the control unit 101 changes a value of a flag CH_FLG which is stored in, for example, the RAM 103 and indicates that the reference position is required to be adjusted to "1". That is, if it is judged in step S903 that the difference between the in-focus position and reference position is equal to or larger than the threshold, if an image shift amount is determined so that an image nonalignment amount for a subject located at a focal length when the focusing lens is located at the reference position becomes zero, the number of pixels of the stereoscopically displayed region falls below the minimum number of pixels. For this reason, in this embodiment, while a plurality of pairs of images for the right and left eyes are sequentially output to the display unit 113, the reference position is changed to get closer to the in-focus position step by step, thereby increasing the number of pixels of the stereoscopically displayed region. By setting the reference position to match the in-focus position after the feed operation of images of the predetermined number N or an elapse of a predetermined time period in which frames of the predetermined number N are played back, a given stereoscopic effect can be presented to the observer in association with the new reference position. For example, when an AF operation is performed during shooting in, for example, moving image data, continuous use of the previous reference position limits the stereoscopically displayed region. Hence, in this embodiment, the control unit 101 changes the reference position in accordance with the in-focus position. Assume that the predetermined number N is determined to be a value which allows a change in stereoscopic effect to be perceived by the observer due to a change of the reference position to fall within a disparity change range in which an unnatural feeling is assumed not to be given to the observer.

In this step, the control unit 101 stores, in the RAM 103, the difference $\Delta X$ between the in-focus position $X_f$ and reference position $X_b$ when the control unit 101 judged that the flag indicating that the reference adjustment position is required to be adjusted is changed to "1" as a parameter $\Delta X_0$ used to change the reference position. Also, the control unit 101 sets "1" in an internal variable n which is stored in the RAM 103 to count image feed operations, so that the reference position matches the in-focus position after the predetermined number N of image feed operations.

The control unit 101 judges in step S905 with reference to the flag which is stored in the RAM 103 and indicates if the reference position is required to be adjusted whether or not the value of the flag is "1". If the control unit 101 judges that the value of the flag is "1", the process advances to step S906; if it judges that the value of the flag is "0", the process advances to step S912.

In step S906, the control unit 101 sets a new value in the reference position $X_b$. In this embodiment, the reference position $X_b$ is sequentially changed using:

$$X_b = X_b + \Delta X_0 \times n/N$$

so that the reference position $X_b$ matches the in-focus position $X_f$ after the predetermined number N of image feed operations since the flag indicating that the reference position is required to be adjusted changes to "1".

In step S907, the control unit 101 determines an image shift amount by executing the image shift amount determination processing in association with the in-focus position $X_f$ and new reference position $X_b$ determined in step S906. Note that, in this embodiment, since the playback processing is executed on the digital camera 100 which has captured images for binocular stereopsis, respective parameters of the image shift amount determination processing can be obtained from the ROM 102 or RAM 103. By contrast, when an external apparatus performs the playback processing, for example, the respective parameters may be included in image related information of each image file or may be determined in advance in a nonvolatile memory of a playback apparatus.

In step S908, the control unit 101 increments the internal variable stored in the RAM 103 to raise a count value by "1". Furthermore, the control unit 101 judges in step S909 whether or not n exceeds the predetermined number N. If the control unit 101 judges that n exceeds the predetermined number N, the process advances to step S910; otherwise, the process jumps to step S911.

In step S910, since image feed operations of the predetermined number N have been made, the control unit 101 changes the value of the flag, which is stored in the RAM 103 and indicates that the reference position is required to be adjusted, to "0".

In step S911, the control unit 101 shifts images for the right and left eyes included in the next image file to be played back in accordance with the determined image shift amount, and controls the display unit 113 to stereoscopically display these images. More specifically, the control unit 101 transfers the image data for the right and left eyes and information of the image shift amount to the image shift unit 112, and controls the image shift unit 112 to shift the image data for the right and left eyes by the image shift amount. Then, the control unit 101 transfers the shifted image data for the right and left eyes to the display unit 113, and controls the display unit 113 to stereoscopically display images. After that, the process returns to step S801.

If the control unit 101 judged in step S905 that the value of the flag indicating that the reference position is required to be adjusted is "0", the control unit 101 determines an image shift amount by executing the image shift amount determination processing in association with the current in-focus position $X_f$ and reference position $X_b$ in step S912. Then, after determining the image shift amount, the control unit 101 advances the process to step S911.

In this manner, using the information of the in-focus position included in the image file, an image shift amount can be determined at the playback timing of images for stereopsis in place of the recording timing of captured images for stereopsis, thus presenting images that allow the observer to perceive an appropriate stereoscopic effect.

Furthermore, in this embodiment, it is explained the method of changing the reference position in series, so as to prevent the number of pixels of a stereoscopically displayed region from being less than the minimum number of pixels when the shifted images for the right and left eyes are stereoscopically displayed on the display unit 113. However, this method is not limited to the case in which the image related information of the image file includes information indicating the in-focus position of the focusing lens, and is applicable to other cases. For example, as is easily understood from the above description, this method is applicable to the case in which the image shift amount is determined for captured images for stereopsis as in the aforementioned first embodiment.

Other Embodiments

Aspects of the present invention can also be realized by a computer of a system or apparatus (or devices such as a CPU or MPU) that reads out and performs a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-255430, filed Nov. 22, 2011, which is hereby incorporated by reference herein in its entirety.

What is claimed is:

1. An image capturing apparatus comprising:
an image capturing unit configured to capture respective light beams which have passed through different regions of an exit pupil of an imaging optical system and to output a first type image and a second type image respectively corresponding to different light beams;
an obtaining unit configured to obtain information of an in-focus position as a driving position of a focusing lens when said image capturing unit captures the first type image and the second type image;
a determination unit configured to determine, based on the information of the in-focus position, an image shift amount for at least one of the first type image and the second type image captured when the focusing lens is located at the in-focus position; and
a recording unit configured to record the image shift amount determined by said determination unit and the first type image and the second type image, associating them with each other,
wherein, said determination unit obtains a first image nonalignment amount, between the first type image and the second type image captured when the focusing lens is located at the in-focus position, of any subject that is positioned a predetermined distance from said image capturing apparatus;
said determination unit obtains a second image nonalignment amount, between the first type image and the second type image obtained when the focusing lens is located at a predetermined reference position, of the subject; and
said determination unit determines the image shift amount, so that the difference between the first image nonalignment amount and the second image nonalignment amount falls within a predetermined range.

2. The apparatus according to claim 1, wherein when a difference between the in-focus position and the reference position is not less than a threshold, said determination unit changes the reference position so that the difference from the in-focus position is reduced, and then determines the image shift amount.

3. The apparatus according to claim 2, wherein when said image capturing unit performs continuous capturing, said determination unit changes the reference position in series, so that the reference position is set to be equal to the in-focus position after an elapse of a predetermined time period from when it is judged that the difference between the in-focus position and the reference position is not less than the threshold.

4. The apparatus according to claim 1, wherein said determination unit determines the image shift amount, so that an image nonalignment amount, between the first type image and the second type image captured when the focusing lens is located at the in-focus position, of any subject, that is to be focused when the focusing lens is located at the reference position, is to be zero.

5. The apparatus according to claim 1, further comprising a control unit configured to perform an automatic focusing operation of the imaging optical system by driving the focusing lens,
wherein the reference position is a driving position of the focusing lens at which capturing was performed before said control unit performs the automatic focusing operation.

6. A playback apparatus comprising:
an obtaining unit configured to obtain a first type image and a second type image obtained by capturing respective light beams which have passed through different regions of an exit pupil of an imaging optical system, and information of an in-focus position as a driving position of a focusing lens of the imaging optical system when the images are captured;

a determination unit configured to determine, based on the information of the in-focus position, an image shift amount for at least one of the first type image and the second type image obtained by said obtaining unit; and an output unit configured to shift at least one of the first type image and the second type image obtained by said obtaining unit in accordance with the image shift amount determined by said determination unit, and to output the shifted images to a display unit which allows binocular stereopsis, wherein, said determination unit obtains a first image non alignment amount when the focusing lens is located at the in-focus position, between the first type image and the second type image obtained by said obtaining unit, of any subject that is positioned a predetermined distance from an image capturing apparatus which captured the images;

said determination unit obtains a second image nonalignment amount, between the first type image and the second type image obtained by the image capturing apparatus when the focusing lens is located at a predetermined reference position, of the subject; and said determination unit determines the image shift amount, so that the difference between the first image nonalignment amount and the second image nonalignment amount falls within a predetermined range.

7. The apparatus according to claim 6, wherein when a difference between the in-focus position and the reference position is not less than a threshold, said determination unit changes the reference position so that the difference from the in-focus position is reduced, and then determines the image shift amount.

8. The apparatus according to claim 7, wherein when said output unit sequentially outputs a plurality of pairs of first type images and second type images continuously captured by the image capturing apparatus, said determination unit changes the reference position in series, so that the reference position is set to be equal to the in-focus position after an elapse of a predetermined time period from when it is judged that the difference between the in-focus position and the reference position is not less than the threshold.

9. The apparatus according to claim 6, wherein said determination unit determines the image shift amount, so that an image nonalignment amount, between the first type image and the second type image captured when the focusing lens is located at the in-focus position, of any subject, that is to be focused when the focusing lens is located at the reference position, is to be zero.

10. A control method of an image capturing apparatus which has an imaging optical system having a focusing lens, the method comprising:

an image capturing step of capturing respective light beams which have passed through different regions of an exit pupil of the imaging optical system and outputting a first type image and a second type image respectively corresponding to different light beams;

an obtaining step of obtaining information of an in-focus position as a driving position of the focusing lens when the first type image and the second type image are captured in the image capturing step;

a determination step of determining, based on the information of the in-focus position, an image shift amount for at least one of the first type image and the second type image captured when the focusing lens is located at the in-focus position; and a recording step of recording the image shift amount determined in the determination step and the first type image and the second type image, associating them with each other, wherein, in the determination step, a first image nonalignment amount, between the first type image and the second type image captured when the focusing lens is located at the in-focus position, of any subject, that is positioned a predetermined distance from said image capturing apparatus, is obtained;

a second image nonalignment amount, between the first type image and the second type image obtained when the focusing lens is located at a predetermined reference position, of the subject is obtained; and the image shift amount is determined, so that the difference between the first image nonalignment amount and the second image nonalignment amount falls within a predetermined range.

11. A control method of a playback apparatus, comprising:

an obtaining step of obtaining a first type image and a second type image obtained by capturing respective light beams which have passed through different regions of an exit pupil of a single imaging optical system, and information of an in-focus position as a driving position of a focusing lens of the imaging optical system when the images are captured;

a determination step of determining, based on the information of the in-focus position, an image shift amount for at least one of the first type image and the second type image obtained in the obtaining step; and an output step of shifting at least one of the first type image and the second type image obtained in the obtaining step in accordance with the image shift amount determined in the determination step, and outputting the shifted images to a display unit which allows binocular stereopsis, wherein, a first image non alignment amount, when the focusing lens is located at the in-focus position, between the first type image and the second type image obtained by said obtaining unit, of any subject, that is positioned a predetermined distance from an image capturing apparatus which captured the images, is obtained;

a second image nonalignment amount, between the first type image and the second type image obtained by the image capturing apparatus when the focusing lens is located at a predetermined reference position, of the subject is obtained; and the image shift amount is determined, so that the difference between the first image nonalignment amount and the second image nonalignment amount falls within a predetermined range.

12. An image capturing system comprising:

an image capturing unit configured to capture respective light beams which have passed through different regions of an exit pupil of an imaging optical system and to output a first type image and a second type image respectively corresponding to different light beams;

an obtaining unit configured to obtain information indicating an in-focus position as a driving position of a focusing lens when said image capturing unit captures the first type image and the second type image;

a determination unit configured to determine, based on the information of the in-focus position, an image shift amount for at least one of the first type image and the second type image captured when the focusing lens is located at the in-focus position; and an output unit configured to shift at least one of the first type image and the second type image captured by said image capturing unit in accordance with the image shift amount determined by said determination unit, and to output the shifted images to a display unit which allows binocular stereopsis, wherein, said determination unit obtains a first image nonalignment amount, between the first type image and the second type image captured when the focusing lens is located at the in-focus position, of any subject that is positioned a predetermined distance from said image capturing apparatus;

said determination unit obtains a second image nonalignment amount, between the first type image and the second type image obtained when the focusing lens is located at a predetermined reference position, of the subject; and said determination unit determines the image shift amount, so that the difference between the first image nonalignment amount and the second image nonalignment amount falls within a predetermined range.

13. A non-transitory computer-readable recording medium recording a program for controlling a computer to function as respective units of an image capturing apparatus of claim 1.

14. A non-transitory computer-readable recording medium recording a program for controlling a computer to function as respective units of a playback apparatus of claim 6.

15. A non-transitory computer-readable recording medium recording a program for controlling a plurality of computers included in an image capturing system to function as respective units of an image capturing system of claim 12.

* * * * *